United States Patent
Han et al.

(10) Patent No.: US 7,140,074 B2
(45) Date of Patent: Nov. 28, 2006

(54) HAND-HELD ELECTRONIC DEVICE INCLUDING HINGE DEVICE

(75) Inventors: Young-Soo Han, Gunpo-Si (KR); Sung-Hyun Ka, Gunpo-Si (KR)

(73) Assignee: Phoenix Korea Co., Ltd. (KR)

( * ) Notice: Subject to any disclaimer, the term of this patent is extended or adjusted under 35 U.S.C. 154(b) by 0 days.

(21) Appl. No.: 10/762,209

(22) Filed: Jan. 20, 2004

(65) Prior Publication Data

US 2005/0155182 A1 Jul. 21, 2005

(51) Int. Cl.
*E05D 11/10* (2006.01)
(52) U.S. Cl. .......................................... 16/366; 16/336
(58) Field of Classification Search ................. 16/303, 16/366, 241–243, 254–257, 277, 282, 284, 16/285, 287, 356, 327–330, 336; 379/433.11–13, 379/434, 433; 455/90, 550, 556, 575; 361/680–683, 361/801–804; 403/118–120
See application file for complete search history.

(56) References Cited

U.S. PATENT DOCUMENTS

| | | | | |
|---|---|---|---|---|
| 4,825,395 | A * | 4/1989 | Kinser et al. ................ | 361/680 |
| 5,278,725 | A | 1/1994 | Konno et al. | |
| 5,363,089 | A | 11/1994 | Goldenberg | |
| 5,517,683 | A * | 5/1996 | Collett et al. ............ | 455/575.1 |
| 5,600,868 | A * | 2/1997 | Tourville et al. ............. | 16/277 |
| 5,657,258 | A | 8/1997 | Grewe et al. | |
| 5,666,694 | A | 9/1997 | Slow et al. | |
| 5,711,013 | A * | 1/1998 | Collett et al. ............... | 455/558 |
| 5,732,331 | A * | 3/1998 | Harms ..................... | 455/575.3 |
| 5,764,760 | A * | 6/1998 | Grandbert et al. ..... | 379/433.13 |
| 5,905,796 | A * | 5/1999 | Jung ..................... | 379/433.13 |
| 5,930,353 | A * | 7/1999 | Lee et al. ............. | 379/433.05 |
| 6,009,568 | A * | 1/2000 | Miyazaki ...................... | 4/236 |
| 6,085,387 | A * | 7/2000 | Han ............................ | 16/330 |
| 6,115,886 | A * | 9/2000 | Fujita .......................... | 16/330 |
| 6,154,359 | A | 11/2000 | Kamikakai et al. | |
| 6,344,977 | B1 * | 2/2002 | Takagi ........................ | 361/814 |
| 6,459,887 | B1 * | 10/2002 | Okuda ....................... | 455/90.1 |
| 6,678,539 | B1 * | 1/2004 | Lu ........................... | 455/575.1 |
| 6,900,981 | B1 * | 5/2005 | Kuivas et al. .............. | 361/683 |
| 6,937,876 | B1 | 8/2005 | Kim | |
| 2002/0038493 | A1 * | 4/2002 | Ko et al. ...................... | 16/303 |
| 2004/0212956 | A1 * | 10/2004 | Kuivas et al. .............. | 361/683 |
| 2005/0122671 | A1 * | 6/2005 | Homer ....................... | 361/681 |

FOREIGN PATENT DOCUMENTS

JP 08-204797 8/1996

(Continued)

*Primary Examiner*—Robert J. Sandy
*Assistant Examiner*—Andre' L. Jackson
(74) *Attorney, Agent, or Firm*—Knobbe Martens Olson & Bear, LLP

(57) ABSTRACT

A hinge device for coupling two units movable to folded and unfolded positions in an apparatus with the two units such as a portable radiotelephone includes a housing, a first rotating member contained in the housing to rotate about a first rotation axis, and a second rotating member rotatable about a second rotation axis. The hinge device includes a first linearly moving member that is linearly movable due to the rotation of the first rotating member, and a second linearly moving member that is linearly movable due to the rotation of the second rotating member. The hinge device includes a first resilient member for urging the first linearly moving member against the first rotating member, and a second resilient member for urging the second linearly moving member against the second rotating member.

36 Claims, 17 Drawing Sheets

FOREIGN PATENT DOCUMENTS

| | | |
|---|---|---|
| JP | 09-130058 | 5/1997 |
| JP | 10-161773 | 6/1998 |
| JP | U 3083003 | 10/2001 |
| KR | 1996-0011641 | 4/1996 |
| KR | 1998-065142 | 10/1998 |
| KR | 1998-079302 | 11/1998 |
| KR | 10-2001-0002894 | 1/2001 |
| KR | 10-2001-0092850 A | 10/2001 |
| KR | 10-2001-0097246 A | 11/2001 |
| KR | 10-20030058623 A | 7/2003 |

* cited by examiner

HAND-HELD ELECTRONIC DEVICE INCLUDING HINGE DEVICE

FIELD OF THE INVENTION

The present invention relates to a hinge device, and more particularly, to a hinge device for coupling two units in a device such as a portable radiotelephone, a PDA or a portable computer comprising two coupled units that can be moved to folded and unfolded positions of the device with respect to each other.

BACKGROUND OF THE INVENTION

A portable device such as a portable folder-type radiotelephone includes two case units coupled to each other through a hinge device. Usually, one unit is provided with a keypad with buttons, and the other unit is provided with a liquid crystal display. When the radiotelephone is in use, the keypad and the liquid crystal display are moved to an unfolded position of the radiotelephone so that the keypad and display can be exposed to the outside. The hinge device allows the two units to be coupled to each other and to be smoothly moved to folded and unfolded positions of the radiotelephone.

A typical hinge device is constructed as follows. The hinge device comprises a rotating member, a linearly moving member, a resilient member, and a housing. The housing contains the rotating member, the linearly moving member and the resilient member. The rotating member can rotate about a rotation axis within the housing, and a portion of the rotating member protrudes outside of the housing to form a coupling portion. The linearly moving member is in contact with the rotating member, and does not rotate within the housing but moves linearly along a rotational shaft of the housing. The resilient member applies a force so that the linearly moving member and the rotating member can be brought into close contact with each other within the housing. At this time, contact surfaces of the linearly moving member and the rotating member are properly configured such that the rotating member easily rotates even without an external force in a certain range and is well maintained in a stationary state at a predetermined location.

One of two case units of a portable radiotelephone that are intended to be coupled to the hinge device constructed as above is fixed to the housing while the other is fixed to the coupling portion of the rotating member. The two units of the portable radiotelephone thus connected are maintained in the stationary state when they are at an unfolded or folded position of the radiotelephone through the operation of the hinge device. Further, in order to move the two units, which have been at the unfolded position or folded position of the radiotelephone, to the folded or unfolded position, a user should initially apply an external force to the two units with his/her hand in a certain range. In a range subsequent to the certain range, the two units are generally automatically moved to the folded or unfolded position.

However, the two case units of the portable folder-type radiotelephone with the hinge device constructed as above are difficult to move to the unfolded position through 180 or more degrees. Even though such movement of the two units may be established, the two units are not placed in the same plane or a portion of the two units protrudes from a plane due to the structure of the hinge device.

SUMMARY OF THE INVENTION

An object of the present invention is to provide a hinge device for coupling two units in a device such as a portable radiotelephone comprising two coupled units that can rotate to folded and unfolded positions of the device with respect to each other. Another object of the present invention is to provide a hinge device for coupling the two units such that the units can move to an unfolded position at 180 or more degrees. A further object of the present invention is to provide a hinge device that allows the two units to be placed in the same plane when they have moved to the unfolded position at 180 degrees. A still further object of the present invention is to provide a hinge device that allows the two units to move to an unfolded position at 360 degrees.

According to an aspect of the present invention, there is provided a hinge device for coupling a first unit rotatable about a first rotation axis and a second unit rotatable about a second rotation axis parallel with the first rotation axis in an apparatus having the first and second units, comprising a housing; a first rotating member adapted to be coupled to the first unit and rotatable about the first rotation axis with respect to the housing; a second rotating member adapted to be coupled to the second unit and rotatable about the second rotation axis with respect to the housing; a first linearly moving member cooperating with the first rotating member and linearly movable with respect to the housing; a second linearly moving member cooperating with the second rotating member and linearly movable with respect to the housing; a first resilient member urging the first linearly moving member against the first rotating member; and a second resilient member urging the second linearly moving member against the second rotating member.

The first and second rotating members may be engagedly rotated in an interlocked state. The first and second rotating members may include mutually engaging gears so that the rotating members can rotate together with each other.

The first and second linearly moving members may be engagedly moved. The first and second linearly moving members may be formed integrally with each other.

In one embodiment, one of the first rotating member and the first linearly moving member includes a first cam portion and the other includes a first cam follower portion cooperating with the first cam portion, and one of the second rotating member and the second linearly moving member includes a second cam portion and the other includes a second cam follower portion cooperating with the second cam portion.

Each of the first and second cam portions may include an upward slant surface and a downward slant surface. The cam portion may include a first insertion groove into which the cam follower portion can be inserted at a distal end of the downward slant surface, a horizontal surface, and a second insertion groove into which the cam follower portion can be inserted.

In one embodiment, the first cam portion includes a first fixing groove into which the first cam follower portion can be inserted and the second cam portion includes a second fixing groove into which the second cam follower portion can be inserted; when the first cam follower portion is inserted into the first fixing groove, the second rotating member can rotates while the first rotating member is maintained in a stationary state; and when the second cam follower portion is inserted into the second fixing groove, the first rotating member can rotates while the second rotating member is maintained in a stationary state.

The first cam portion may include a horizontal surface contiguous to the first fixing groove, and stoppers at both ends thereof for preventing movement of the first cam follower portion. The horizontal surface of the first cam portion may be provided with at least one stopper groove relatively shallower than the first and second fixing grooves. The second cam portion may further include an upward slant surface, a horizontal surface, and a stopper at one end thereof for preventing movement of the second cam follower portion. On the contrary, the second cam portion may include an upward slant surface and a downward slant surface.

In one embodiment, one of the first rotating member and the first linearly moving member includes a first protrusion and the other includes a groove into which the first protrusion can be inserted, and one of the second rotating member and the second linearly moving member includes a second protrusion and the other includes a second groove into which the second protrusion can be inserted. The member provided with the first groove may be formed with a track for guiding movement of the first protrusion, and the member provided with the second groove may be formed with a track for guiding movement of the second protrusion.

In one embodiment, the first and second linearly moving members are provided with through-holes, the first and second rotating members have extension rods extending in the first and second rotation axes, respectively, and the first and second linearly moving members and the first and second resilient members are fitted around the extension rods.

In one embodiment, the housing has passages through which a circuit wire connecting between the first and second units passes. The first and second rotating members may be connected to the first and second units at one end of the housing, and the other end of the housing may be provided with holes through which a circuit wire passes.

BRIEF DESCRIPTION OF THE DRAWINGS

Preferred embodiments of the present invention will be described with reference to the accompanying drawings so that those skilled in the art can clearly understand the objects and features of the present invention, in which.

DETAILED DESCRIPTION OF THE PREFERRED EMBODIMENTS

Figure 1:
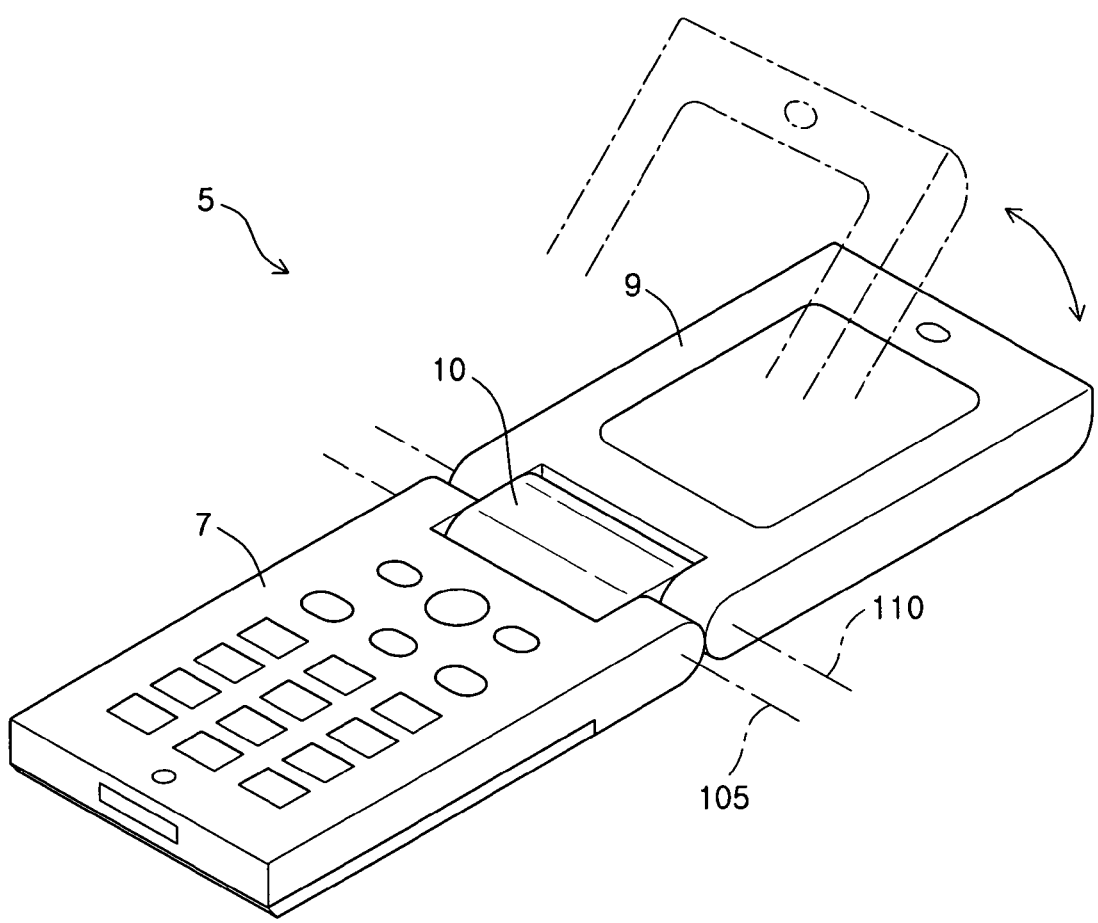
FIG. 1 is a perspective view of a portable radiotelephone employing a hinge device according to a first embodiment of the present invention.

FIG. 1 is a perspective view of a portable folder-type radiotelephone employing a hinge device according to a first embodiment of the present invention. Referring to FIG. 1, a portable radiotelephone 5 includes a first unit 7 provided with a keypad, and a second unit 9 provided with a liquid crystal display. The first and second units 7 and 9 are rotatably coupled to each other by means of a hinge device 10.

FIGS. 2 to 8 are views of the hinge device with two shafts according to the embodiment of the present invention shown in FIG. 1. In the hinge device of this embodiment, the two shafts are engagedly operated. Referring to FIGS. 2a to 7, the hinge device 10 includes a case 20, first and second rotating members 30 and 40, a linearly moving member 50, first and second resilient members 98 and 99, a supporting plate 100, and a case cover 24.

Referring to FIGS. 1 to 4, the case 20 includes first and second end walls 21 and 22, and a sidewall 23 for connecting the first and second end walls 21 and 23 to each other. The case cover 24 closes an opening that is not covered by the sidewall 23. When the cover 24 is coupled to the case 20, passage holes 201 are defined at both sides (only one side is shown in FIG. 2a) of the hinge device adjacent to the second end wall 22. The passage holes 201 communicate with a second chamber 27 of the case 20 to be described later. Electrical wires (preferably, a flexible printed cable) for connecting the first and second units 7 and 9 of the radiotelephone 5 to each other pass through the passage holes 201. The first end wall 21 is provided with two through-holes 211 and 212. The second end wall 22 is provided with first and second cylindrical coupling stubs 221 and 222 protruding outside at positions corresponding to the two through-holes 211 and 212 formed at the first end wall 21. Although not specifically shown in the figures, the first and second coupling stubs 221 and 222 are inserted into coupling holes provided in the first unit (designated by reference numeral 7 in FIG. 1) and the second unit (designated by reference numeral 9 in FIG. 1) of the portable radiotelephone (designated by reference numeral 5 in FIG. 1), respectively. The units freely rotate with respect to the respective coupling stubs. A first rotation axis 105 passes through the center of the first coupling stub 221 and the center of a first rotating member 30 to be described later. The first unit 7 of the portable radiotelephone 5 rotates about the first rotation axis 105 with respect to the hinge device 10. A second rotation axis 110 passes through the center of the second coupling stub 222 and the center of a second rotating member 40 to be described later. The second unit 9 of the portable radiotelephone 5 rotates about the second rotation axis 110 with respect to the hinge device 10.

Figure 3:
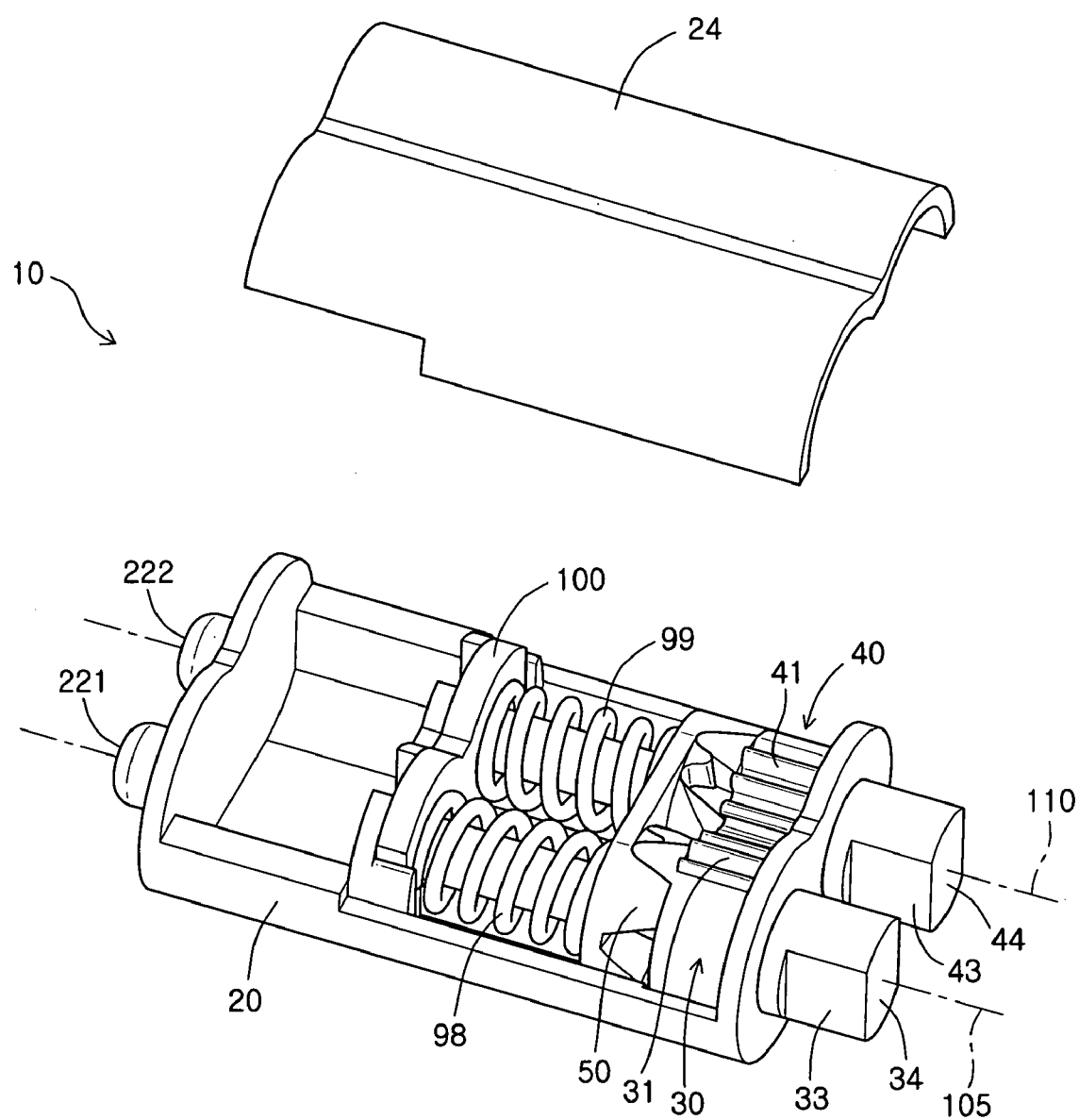
FIG. 3 is a perspective view showing the interior of the hinge device of the FIG. 2a with a case cover separated therefrom.
Figure 4:
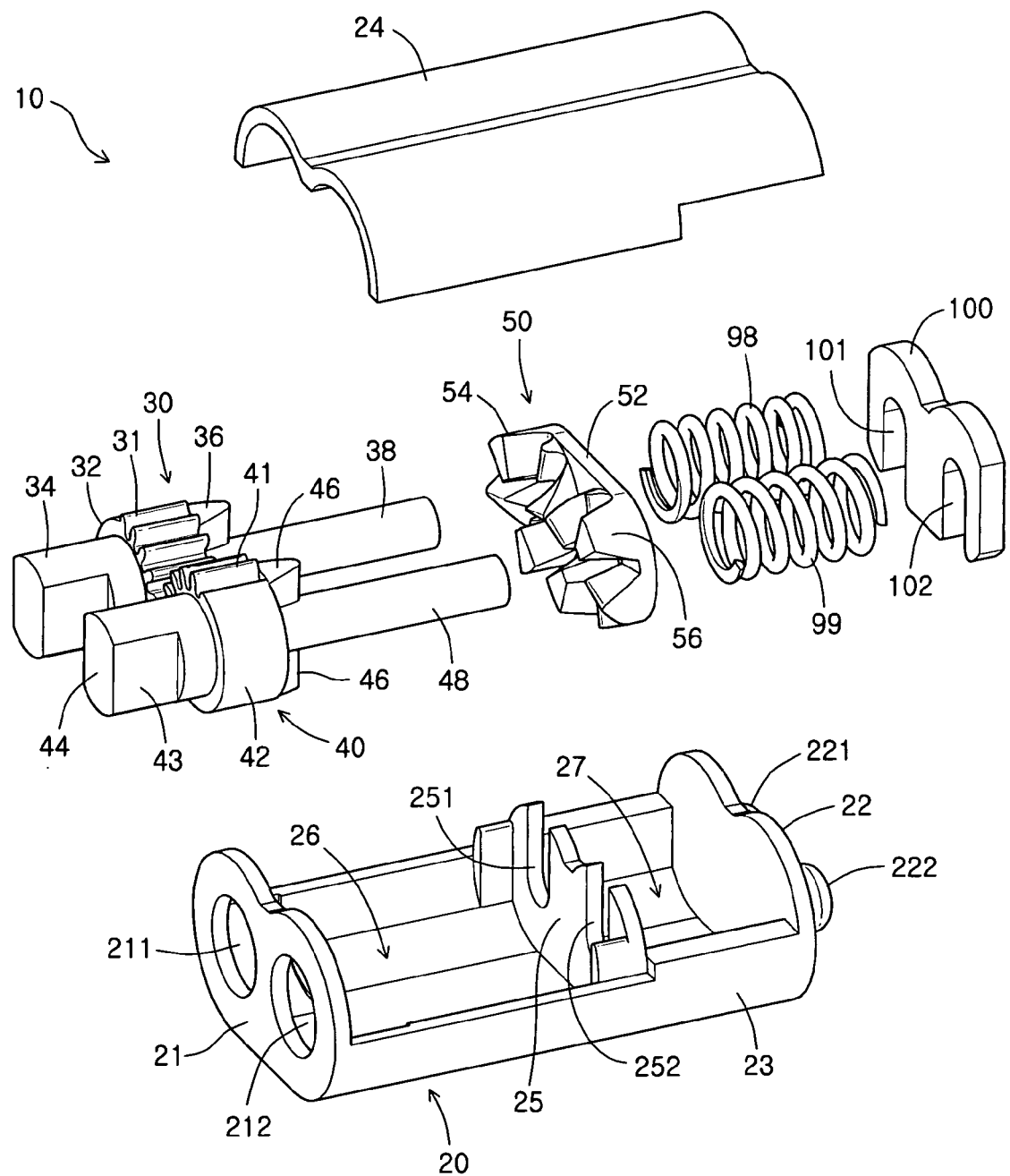
FIG. 4 is an exploded perspective view of the hinge device of FIG. 2.

Referring to FIGS. 3 and 4, a supporting wall 25 is provided in the case 20 to be parallel with the two end walls 21 and 22 at an intermediate position therebetween. The supporting wall 25 is provided with U-shaped passages 251 and 252 at positions corresponding to the two through-holes 211 and 212 formed at the first end wall 21, respectively. The inner space of the case 20 is partitioned by the supporting wall 25 into a first chamber 26 on the side of the first end wall 21 and the second chamber 27 on the side of the second end wall 22. The first chamber 26 contains the first and second rotating members 30 and 40, a linearly moving member 50, first and second resilient members 98 and 99, and a supporting plate 100, which will be described later.

Figure 6:
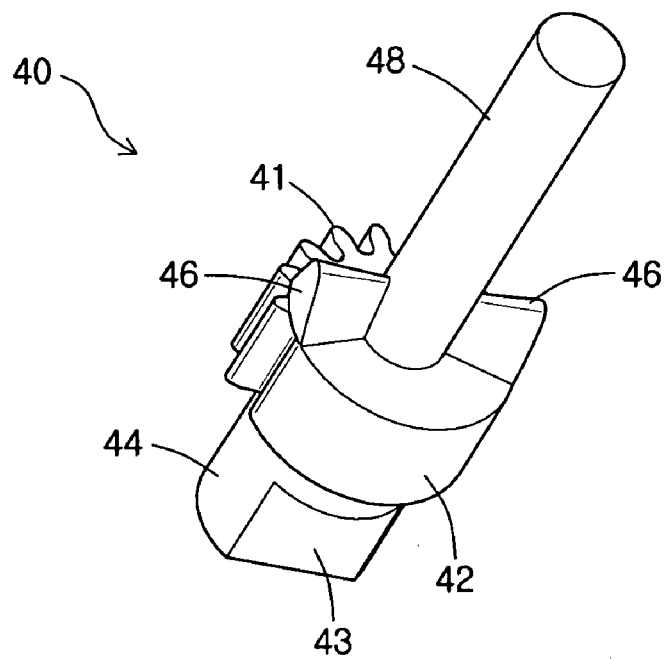
FIG. 6 is a perspective view of a second rotating member in FIG. 4.

Referring to FIGS. 3, 4 and 6, the first and second rotating members 30 and 40 take the shape of elongated posts extending between the first end wall 21 and the supporting wall 25 of the case 20. The two rotating members 30 and 40 are configured to be the same as or symmetric with each other. The first and second rotating members 30 and 40 include first and second gear portions 32 and 42, first and second coupling portions 34 and 44, first and second cam follower portions, and first and second extension rods 38 and 48, respectively. Only the second rotating member 40 will be described in detail below. A gear 41 is formed on a peripheral surface of the second gear portion 42 and engaged with a gear 31 of the first gear portion 32 so that the gears can be engaged with each other to rotate in opposite directions. A side surface of the second gear portion 42 is placed in the first chamber 26 of the case 20 to face the first end wall 21. The second coupling portion 44 is provided with a key surface 43 and extends from the second gear portion 42 to protrude outside of the case 20 through the through-hole 212 of the first end wall 21. Although not specifically shown in the figures, the first and second coupling portions 34 and 44 of the first and second rotating members 30 and 40 are engaged with the coupling holes formed in the first unit (designated by reference numeral 7 in FIG. 1) and the second unit (designated by reference numeral 9 in FIG. 1) of the portable radiotelephone (designated by reference numeral 5 in FIG. 1), respectively, to rotate together with the units. The second extension rod 48 extends from the second gear portion 42 to the supporting wall 25 of the case 20 so that a distal end of the second extension rod can be fitted into the passage 252. The second cam follower portion is provided with two cam follower protrusions 46 placed at an interval of 180 degrees. The two cam follower protrusions 46 protrude from the second gear portion 42 at both lateral sides of the second extension rods 48.

Figure 5:
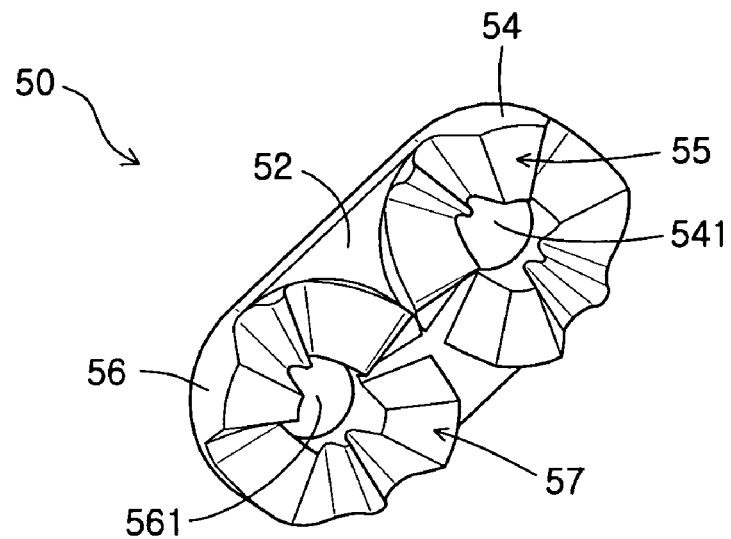
FIG. 5 is a perspective view of a linearly moving member in FIG. 4.

Referring to FIGS. 3, 4 and 5, the linearly moving member 50 includes a base plate 52, and first and second cam portions 54 and 56 formed on the base plate 52. Through-holes 541 and 561 are formed at the centers of the first and second cam portions 54 and 56, respectively. The extension rods 38 and 48 of the first and second rotating members 30 and 40 are fitted into the through-holes 541 and 561 so that the first and second cam portions 54 and 56 can face and cooperate with the cam follower protrusions 36 and 46 of the first and second rotating members 30 and 40.

Figure 7:
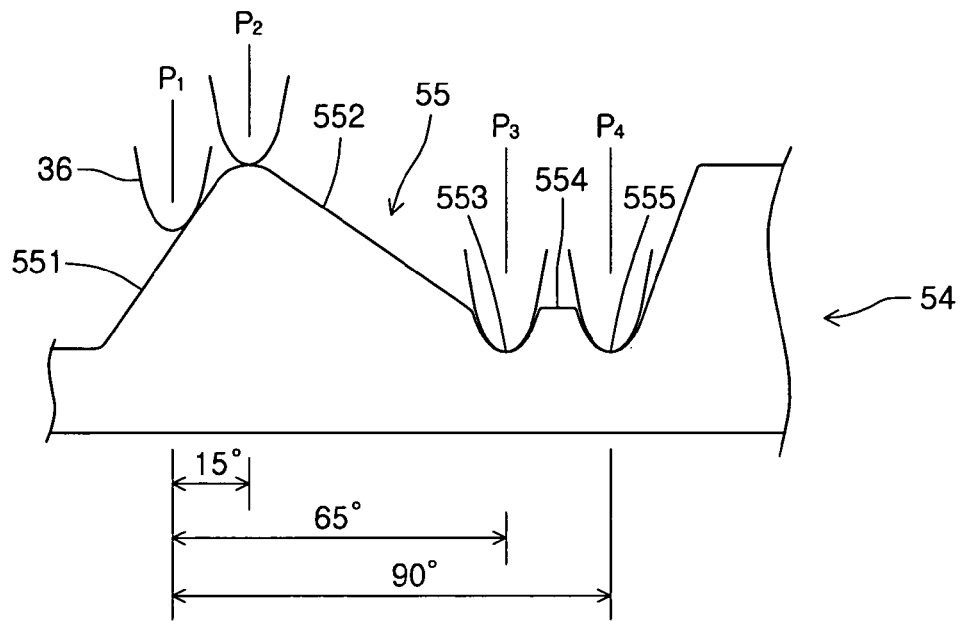
FIG. 7 is a view showing a deployed cam surface of the linearly moving member of FIG. 5.

A profile of a cam surface of the first cam portion 54 and a profile of a cam surface 57 of the second cam portion 56 are symmetric with each other about a centerline for separating the two cam portions. A portion of the profile of the cam portion 55 of the cam surface 55 corresponding to one cam follower 36 is shown in FIG. 7, wherein exemplary values of angles are also shown. The cam profile shown in FIG. 7 appears twice at an interval of 180 degrees on the first cam portion 54. Referring to FIG. 7, the cam surface 55 sequentially includes an upward slant surface 551, a downward slant surface 552, a first insertion groove 553, a horizontal surface 554, and a second insertion groove 555. A high and steep wall is placed next to the second insertion groove 555 so that the cam follower protrusion 36 cannot proceed further. The cam follower protrusion 36 moves between a location (position P1) on the upward slant surface 551 and the second insertion groove 555.

Referring to FIGS. 3 and 4, the first and second resilient members 98 and 99 are compression coil springs and fitted around the first and second extension rods 38 and 48 of the first and second rotating members 30 and 40, respectively. One side of each of the first and second resilient members 98 and 99 is in contact with the linearly moving member 50 and the other side is in contact with the supporting plate 100, which will be described later, to urge the linearly moving member 50 against the cam follower protrusions 36 and 46.

Referring to FIGS. 3 and 4, the supporting plate 100 is contained in the first chamber 26 of the case 20 to be disposed between the supporting wall 25 and the resilient members 98 and 99. The supporting plate 100 is provided with two passages 101 and 102 through which the first and second extension rods 38 and 48 of the first and second rotating members 30 and 40 pass. The supporting plate 100 facilitates assembly works by beforehand compressing the first and second resilient members 98 and 99.

Figure 2A:
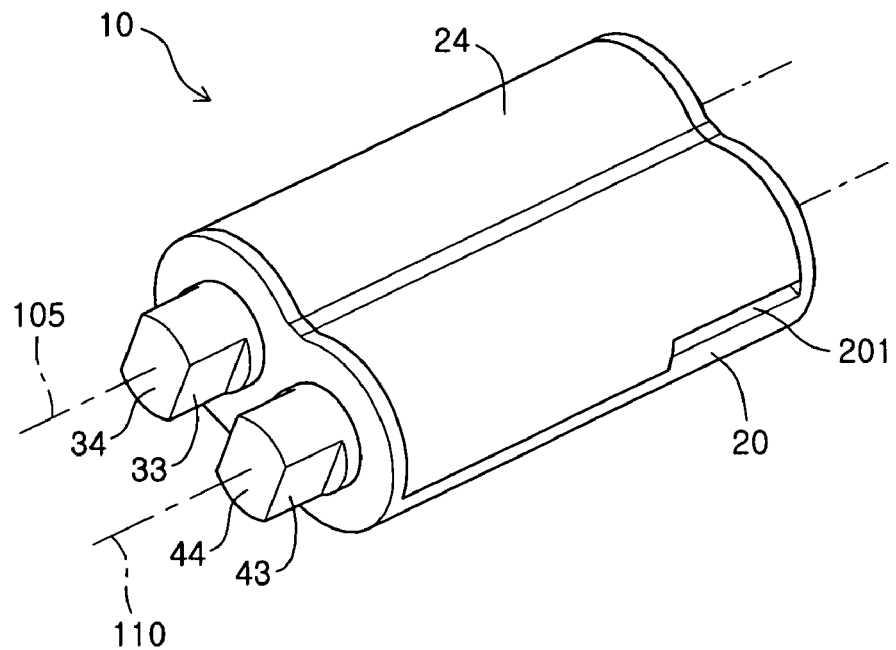
FIGS. 2a and 2b are perspective views of the hinge device of FIG. 1.
Figure 2B:
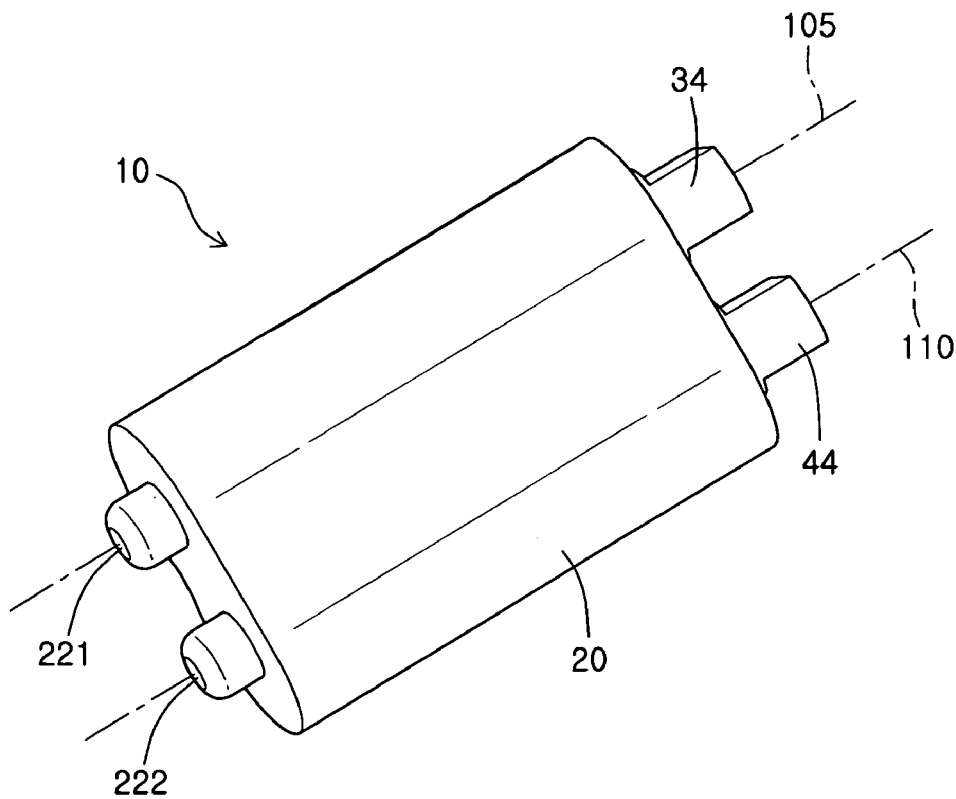
Figure 8:
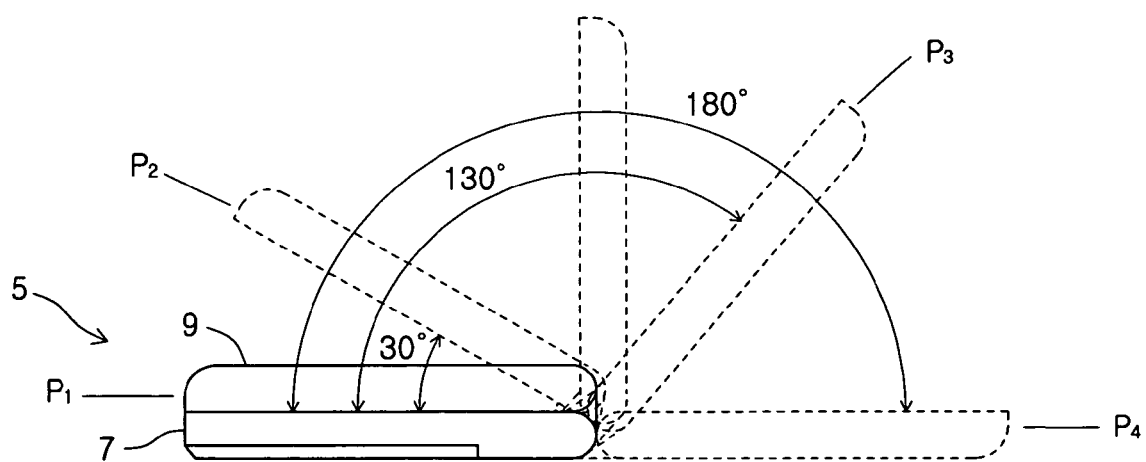
FIG. 8 is a side view showing states where the radiotelephone of FIG. 1 is folded and unfolded.

Now, the operation of the hinge device according to this embodiment will be described with reference to FIGS. 2 to 8. As shown in FIG. 2, the first and second rotating members 30 and 40 rotate in opposite directions at the same angle since they are connected by means of the gears 31 and 41. FIG. 8 shows the corresponding positions of the second unit 9 of the portable radiotelephone 5 when the cam follower protrusion 36 of the first cam follower portion is located at positions P1, P2, P3 and P4 on the cam surface 55 of the first cam portion 54 shown in FIG. 7. Although not shown in the figure, a cooperative relationship between the second cam portion 56 and the cam follower protrusion 46 of the second cam follower portion is the same as that between the first cam portion 54 shown in FIG. 7 and the first cam follower portion. As for same positions P1 to P4, the angles shown in FIG. 8 are twice as large as the relevant angles shown in FIG. 7. It can be understood by those skilled in the art that this is because FIG. 7 shows the rotation angle of the first rotating member 30 connected to the first unit 7 of the portable radiotelephone 5, whereas the rotation angle of the second unit 9 with respect to the first unit 7 shown in FIG. 8 is the sum of the rotation angles of the first and second rotating members 30 and 40.

Referring to FIGS. 7 and 8, position P1 corresponds to a state where the second member 9 is at a fully folded position of the radiotelephone. Since the cam follower protrusion 36 is placed on the upward slant surface 36, the radiotelephone 5 receives a force so that it can be continuously maintained in the folded state. In a range from position P1 to position P2, the first unit 7 of the portable radiotelephone 5 rotates from 0 to 15 degrees with respect to the hinge device 10. In this range, the first unit 7 is subjected to a force that causes it to automatically move to the folded position of the portable radiotelephone by means of the cooperation of the cam follower protrusion 36 and the upward slant surface 551. Further, the angle between the first and second units 7 and 9 of the radio radiotelephone 5 in this range increases from 0 to 30 degrees. In a range from position P2 to position P3, the first unit 7 of the portable radiotelephone 5 rotates from 15 to 65 degrees with respect to the hinge device 10. In this range, the first unit 7 is subjected to a force that causes it to automatically move to an unfolded position of the portable radiotelephone by means of cooperation between the cam follower protrusion 36 and the downward slant surface 552. Further, the angle between the first and second units 7 and 9 of the radio radiotelephone 5 in this range increases from 30 to 130 degrees. At position P3, the cam follower protrusion 36 is inserted into and stops in the first insertion groove 553. At any location between positions P3 and P4, a force is exerted on the second unit 9 to stop thereat. Position P4 is a position where the first unit 7 of the portable radiotelephone 5 has rotated by 90 degrees with respect to the hinge device 10. At position P4, the cam follower protrusion 36 is inserted into and stops in the second insertion groove 555. FIG. 3 shows the hinge device in this state.

Figure 9:
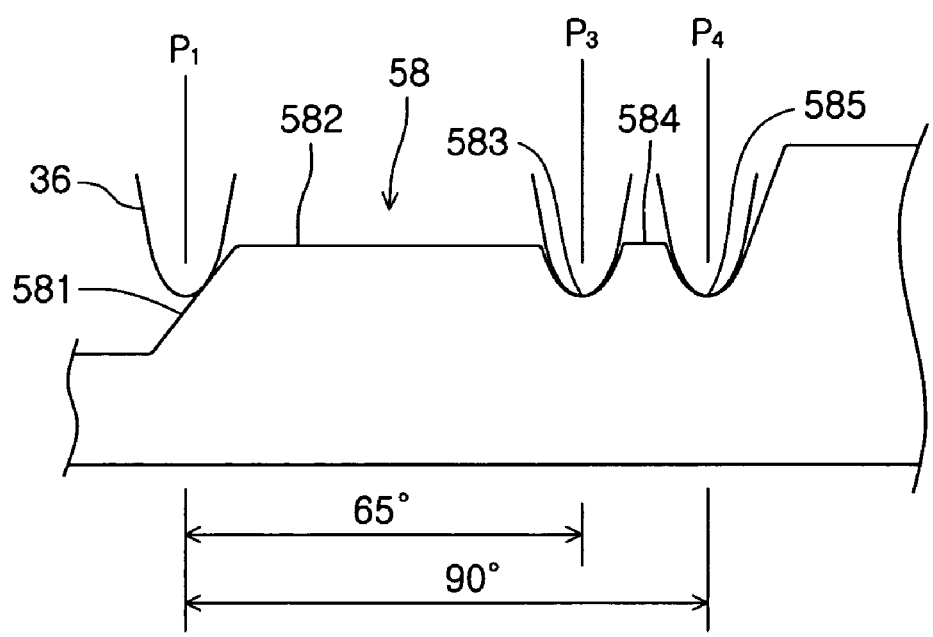
FIG. 9 is a view showing a deployed cam surface of a modified example of the linearly moving member employed in the hinge device of FIG. 2.

The cam surface may be configured as shown in FIG. 9 differently to that shown in FIG. 7. That is, a cam surface 58 sequentially includes an upward slant surface 581, a first horizontal surface 582, a first insertion groove 583, a second horizontal surface 584, and a second insertion groove 585. A high wall is placed next to the second insertion groove 585 so that the cam follower protrusion 36 cannot proceed further. When the cam follower protrusion 36 is located at position P1, the portable radiotelephone is maintained in the fully folded state. When the cam follower protrusion 36 is located at position P4, i.e. in the second insertion groove 585, the portable radiotelephone is fixed at an unfolded position at 180 degrees (at position P4 shown in FIG. 8). When the cam follower protrusion 36 is located at position P3, i.e. in the first insertion groove 583, the angle between the two units of the portable radiotelephone becomes 130 degrees in a state corresponding to P3 in FIG. 8. When the cam follower protrusion 36 is located on the first or second horizontal surface 582 or 584, the portable radiotelephone is maintained in a stationary state at an arbitrary position. Although the first insertion groove 553 or 583 has been shown in FIGS. 7 and 9 as being located to define 65 degrees, the present invention is not limited thereto. The first insertion groove 553 or 583 may be located at any positions to be formed at a variety of different angles.

Although the operating angles of the hinge device have been described by way of examples in the aforementioned embodiment, the present invention is not limited thereto. It can be understood by those skilled in the art that the operating angles may be set differently.

FIGS. 10 to 17 are views of a hinge device with independently operating two axes according to a second embodiment of the present invention. Referring to FIGS. 10 to 13, a hinge device 10b includes a case 20b, first and second rotating members 30b and 40b, first and second linearly moving members 60b and 70b, first and second resilient members 98b and 99b, first and second supporting plates 110b and 120b, and a case cover 24b.

The configuration of the case 20b is similar to that of the case 20 of the first embodiment except that the first chamber 26b is provided with an upright separation wall 29b that connects a supporting wall 25b to a first end wall 21b. The first chamber 26b is divided into two halves, i.e. a first sub-chamber 261b and a second sub-chamber 262b, by means of separation wall 29b. The first sub-chamber 261b contains the first rotating member 30b, the first linearly moving member 60b, the first resilient member 98b and the first supporting plate 110b, which will be described later. The second sub-chamber 262b contains the second rotating member 40b, the second linearly moving member 70b, the second resilient member 99b and the second supporting plate 120b, which will be described later. The first and second rotating members 30b and 40b rotate about first and second rotation axes 105 and 110, respectively.

The first and second rotating members 30b and 40b take the shape of elongated posts extending between the first end wall 21b and the supporting wall 25b within the first and second sub-chambers 261b and 262b, respectively. The first and second rotating members 30b and 40b include base portions 32b and 42b, coupling portions 34b and 44b, cam follower portions, and extension rods 38b and 48b, respectively. Since the rotating members 30b and 40b have the same configuration as each other, only the first rotating member 30b will be described in detail below. The base portion 32b is in the form of a disk of which one end surface faces to the first end wall 21b of the first sub-chamber 261b of the case 20b. The coupling portion 34b is in the form of a rectangular rod and extends from the base portion 32b so that it can protrudes outside of the case 20b through a through-hole 211b of the first end wall 21b. Although not specifically shown in the figures, the coupling portions 34b and 44b of the first and second rotating members 30b and 40b are engaged with the coupling holes provided in the first unit (designated by reference numeral 7 in FIG. 1) and the second unit (designated by reference numeral 9 in FIG. 1) of the portable radiotelephone (designated by reference numeral 5 in FIG. 1) and rotate along with the first and second units, respectively. The extension rod 38b extends from the base portion 32b to the supporting wall 25b of the case 20b so that a distal end of the extension rod can be fitted into a passage 251b. The cam follower portion is provided with two cam follower protrusions 36b placed at an interval of 180 degrees. The two cam follower protrusions 36b protrude from the base portion 32b at both lateral sides of the extension rods 38b.

Through-holes 62b and 72b are formed at the centers of the first and second linearly moving members 60b and 70b, respectively. The extension rods 38b and 48b of the first and second rotating members 30b and 40b are fitted into the through-holes 62b and 72b. The first and second linearly moving members 60b and 70b have cam portions 64b and 74b formed at surfaces thereof facing the cam follower protrusions 36b and 46b of the first and second rotating members 30b and 40b, respectively. The cam follower protrusion 36b of the first rotating member 30b cooperates with the cam portion 64*b* of the first linearly moving member 60*b*, while the cam follower protrusion 46*b* of the second rotating member 40*b* cooperates with the cam portion 74*b* of the second linearly moving member 70*b*. Cam profiles of the cam portions 64*b* and 74*b* of the first and second linearly moving members 60*b* and 70*b* are partially shown in FIGS. 15*a* and 15*b*, respectively.

Figure 15A:
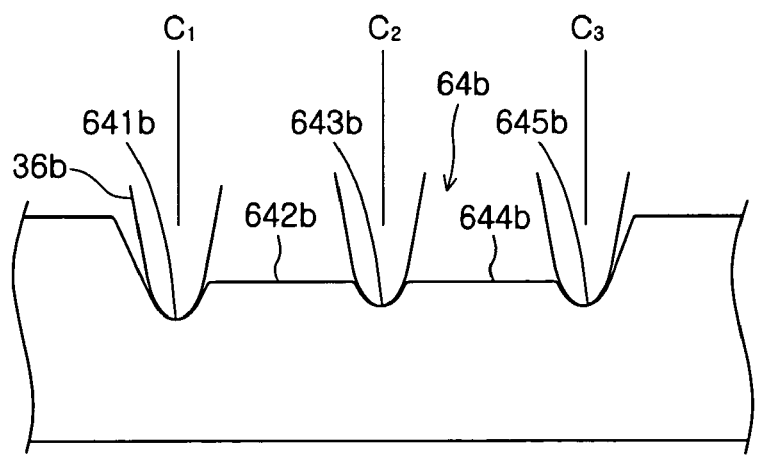
FIGS. 15a and 15b are a view showing a deployed cam surface of the first linearly moving member of FIG. 12, and a view showing a deployed cam surface of the second linearly moving member of FIG. 13, respectively.
Figure 15B:
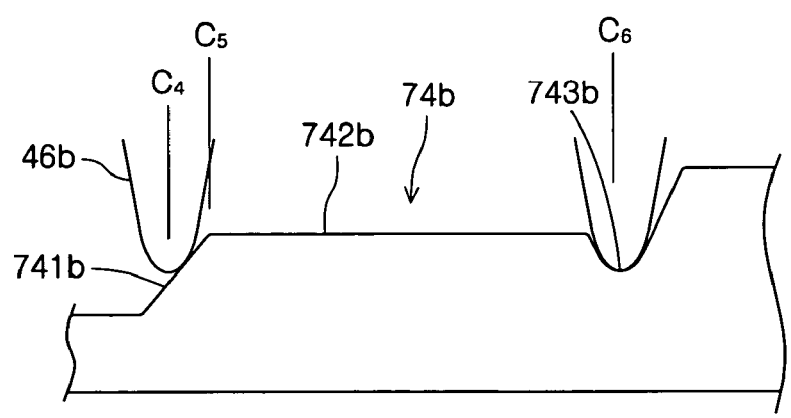

Referring to FIGS. 15*a* and 15*b*, the cam portion 64*b* of the first linearly moving member sequentially includes a fixing groove 641*b* (which is a groove relatively deeper than a stopper groove to be described later), a first horizontal surface 642*b*, a first stopper groove 643*b*, a second horizontal surface 644*b*, and a second stopper groove 645*b*. Outer sides of the fixing and stopper grooves 641*b* and 645*b* are blocked with high walls so that the cam follower protrusion 36*b* of the first rotating member cannot proceed further. The cam follower protrusion 36*b* of the first rotating member moves between the fixing groove 641*b* and the second stopper groove 645*b*. The portion of the cam profile shown in FIG. 15*a* is repeatedly placed at an interval of 180 degrees on the first linearly moving member.

Referring to FIG. 15*b*, the cam portion 74*b* of the second linearly moving member sequentially includes an upward slant surface 741*b*, a horizontal surface 742*b*, and a fixing groove 743*b*. The fixing groove 743*b* is deeper than the first and second stopper grooves 642*b* and 643*b* provided at the cam portion 64*b* of the first linearly moving member. A high wall is placed next to the fixing groove 743*b* so that the cam follower protrusion 46*b* of the second rotating member cannot proceed further. The cam follower protrusion 46*b* of the second rotating member moves between a location (position C4) on the upward slant surface 741*b* and the fixing groove 743*b*.

Figure 10:
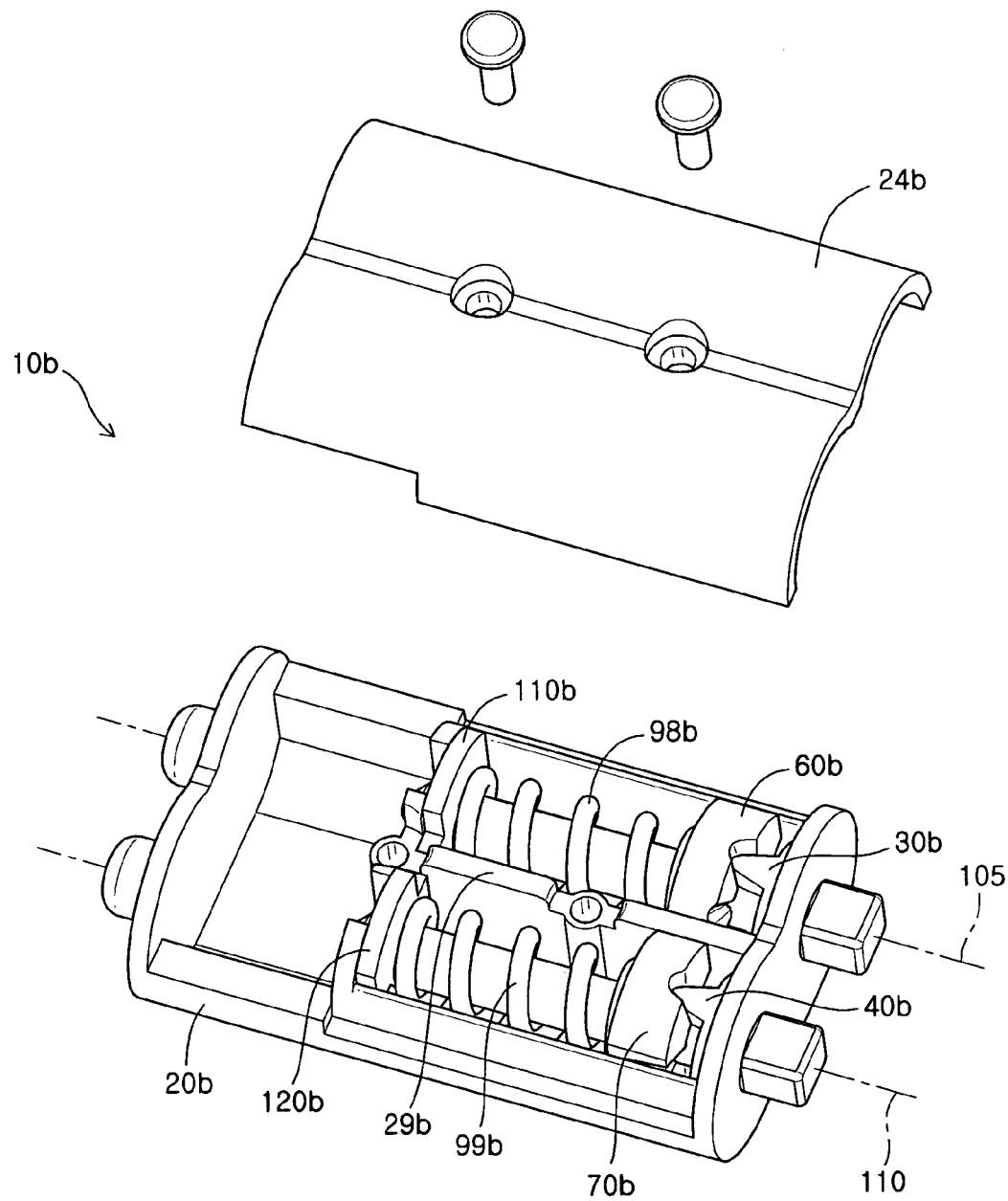
FIG. 10 is a perspective view of a hinge device according to a second embodiment of the present invention, with a case cover separated therefrom to show the interior of the hinge device.
Figure 11:
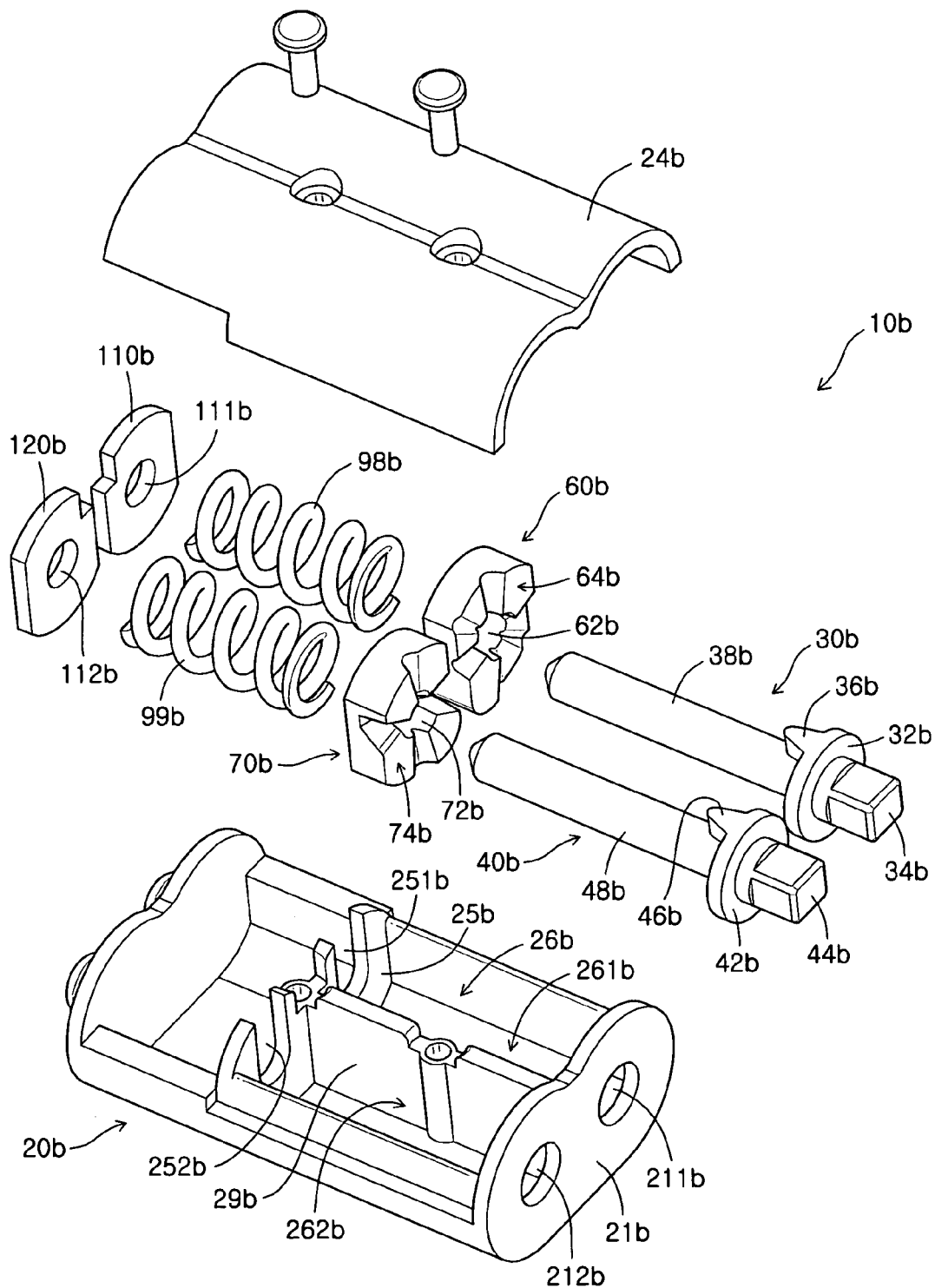
FIG. 11 is an exploded perspective view of the hinge device of FIG. 10.
Figure 12:
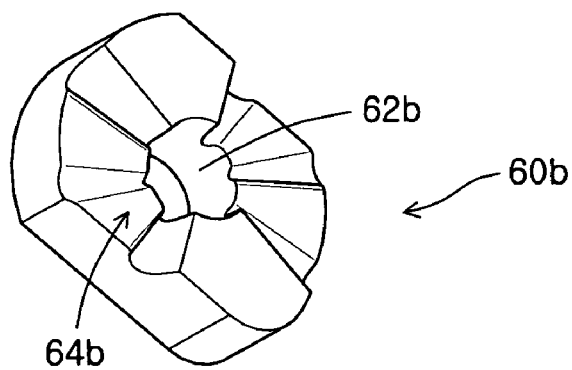
FIG. 12 is a perspective view of a first linearly moving member in FIG. 11.
Figure 13:
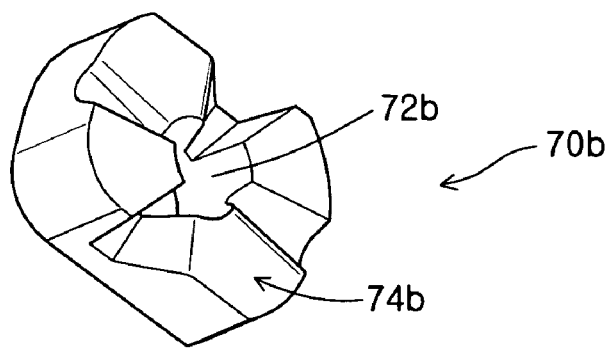
FIG. 13 is a perspective view of a second linearly moving member in FIG. 11.

Referring to FIGS. 10 and 11, the first and second resilient members 98*b* and 99*b* are fitted around the first and second extension rods 38*b* and 48*b* of the first and second rotating members 30*b* and 40*b*, respectively. One ends of the first and second resilient members 98*b* and 99*b* are in contact with the linearly moving members 60*b* and 70*b* and the other ends are in contact with the first and second supporting plates 110*b* and 120*b* to urge the first and second linearly moving members 60*b* and 70*b* against the cam follower protrusions 36*b* and 46*b* of the first and second rotating members 30*b* and 40*b*, respectively.

The first and second supporting plates 110*b* and 120*b* take the same shape as each other and are contained in the first and second sub-chambers 261*b* and 262*b* of the case 20*b* to be in contact with the supporting wall 25*b*, respectively. The first and second supporting plates 110*b* and 120*b* are in contact with the other ends of the first and second resilient members 98*b* and 99*b*, respectively. The two supporting plates 110*b* and 120*b* are provided with passages 111*b* and 112*b*, respectively, so that the first and second extension rods 38*b* and 48*b* of the first and second rotating members 30*b* and 40*b* can pass therethrough. The supporting plates 110*b* and 120*b* facilitate assembly works by beforehand compressing the resilient members 98*b* and 99*b*. It can be understood by those skilled in the art that the supporting plates may be omitted, if necessary.

Figure 16:
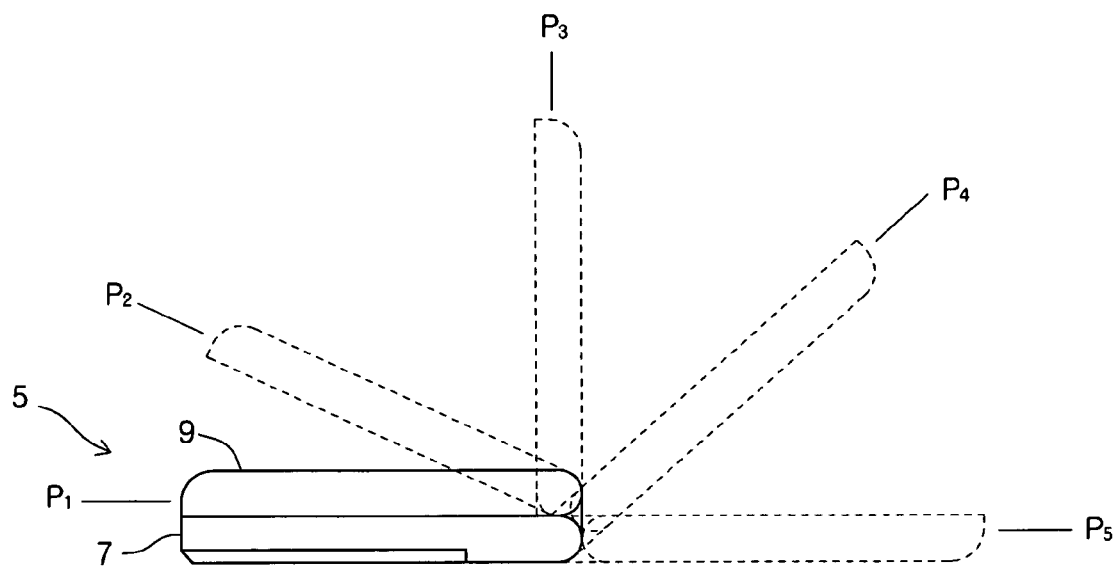
FIG. 16 is a side view showing states where a radiotelephone employing the hinge device of FIG. 10 is folded and unfolded.

FIG. 16 shows the corresponding positions of the second unit 9 of the portable radiotelephone 5 when the cam follower protrusions 36*b* and 46*b* are located at positions C1, C2, C3, C4, C5 and C6 on the first and second cam portions 64*b* and 74*b* of the first and second linearly moving members shown in FIG. 15, respectively. Referring to FIGS. 15 and 16, position P1 corresponds to a state where the second member 9 is at a fully folded position of the radiotelephone.

At this time, the cam follower protrusions 36*b* and 46*b* of the first and second rotating members are located at positions C1 and C4, respectively. When the second unit 9 of the portable radiotelephone 5 is moved to an unfolded position of the portable radiotelephone in such a state, the cam follower protrusion 36*b* of the first rotating member is engaged in the fixing groove 641*b* and does not move, whereas the cam follower protrusion 46*b* of the second rotating member rides upward on the upward slant surface 741*b*. When the cam follower protrusion 46*b* of the second rotating member is located at position C5, the second unit 9 is located at position P2 in FIG. 16. When the second unit 9 is further moved away from the first unit, the cam follower protrusion 46*b* of the second rotating member moves to position C6 while the cam follower protrusion 36*b* of the first rotating member remains engaged. This state corresponds to a state where the second unit 9 is located at position P3 in FIG. 16. When the second unit 9 of the portable radiotelephone 5 is further moved away from the first unit in such a state, the cam follower protrusion 46*b* of the second rotating member cannot proceed further, whereas the cam follower protrusion 36*b* of the first rotating member escapes from the fixing groove 641*b* and moves to position C2. This state corresponds to a state where the second unit 9 is located at position P4 in FIG. 16. When the second unit 9 of the portable radiotelephone 5 is further moved away from the first unit in such a state, the cam follower protrusion 36*b* of the first rotating member moves to and is engaged at position C3. This state corresponds to a state where the second unit 9 is located at position P5 and is at an unfolded position at 180 degrees in FIG. 16. When the cam follower protrusion 46*b* of the second rotating member is located on the horizontal surface 742*b* of the cam portion 74*b* of the second linearly moving member, or the cam follower protrusion 36*b* of the first rotating member is located on the first or second horizontal surface 642*b* or 644*b* of the cam portion 64*b* of the first linearly moving member, the second unit 9 is maintained in a stationary state at an arbitrary position.

When the second unit 9 is moved toward the first unit, the cooperation between the first linearly moving member 60*b* and the first rotating member 30*b* first occurs since the cam follower protrusion 46*b* of the second rotating member 40*b* has been inserted into the fixing groove 743*b*. Then, cooperation between the second linearly moving member 70*b* and the second rotating member 40*b* occurs.

Figure 14:
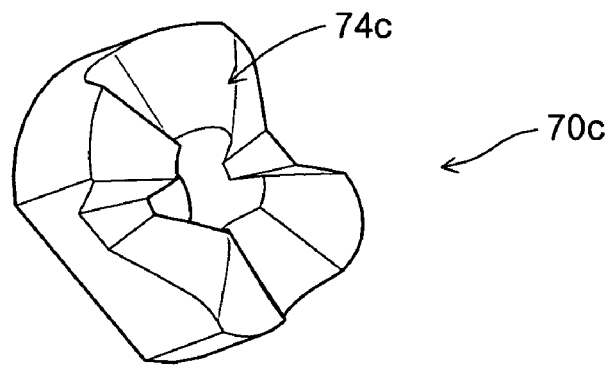
FIG. 14 is a perspective view of a modified example of the second linearly moving member in FIG. 11.
Figure 17:
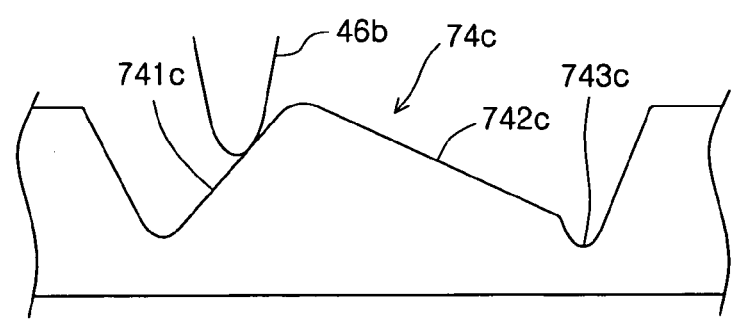
FIG. 17 is a view showing a deployed cam surface of the linearly moving member of FIG. 14.

The cam portion of the second linearly moving member may have a profile shown in FIG. 17 rather than the profile shown in FIG. 15*b*. FIG. 14 is a perspective view of a linearly moving member having this cam profile. That is, a cam portion 74*c* of the second linearly moving member sequentially includes an upward slant surface 741*c*, a downward slant surface 742*c*, and a fixing groove 743*c*. A high wall is placed next to the fixing groove 743*c* so that the cam follower protrusion 46*b* cannot proceed further. The cam follower protrusion 46*b* moves between a location on the upward slant surface 741*c* and the fixing groove 743*c*.

In the above embodiments, the end wall of the case is formed with coupling portions to which the first and second units of the portable radiotelephone are coupled in a freely rotatable state. However, the present invention is not limited thereto. In the hinge device of the above embodiments, the end wall may be provided with through-holes rather than the coupling portions so that the extension rods of the first and second rotating members can pass therethrough and thus distal ends of the extension rods can be coupled to the first and second units of the portable radiotelephone.

Figure 18:
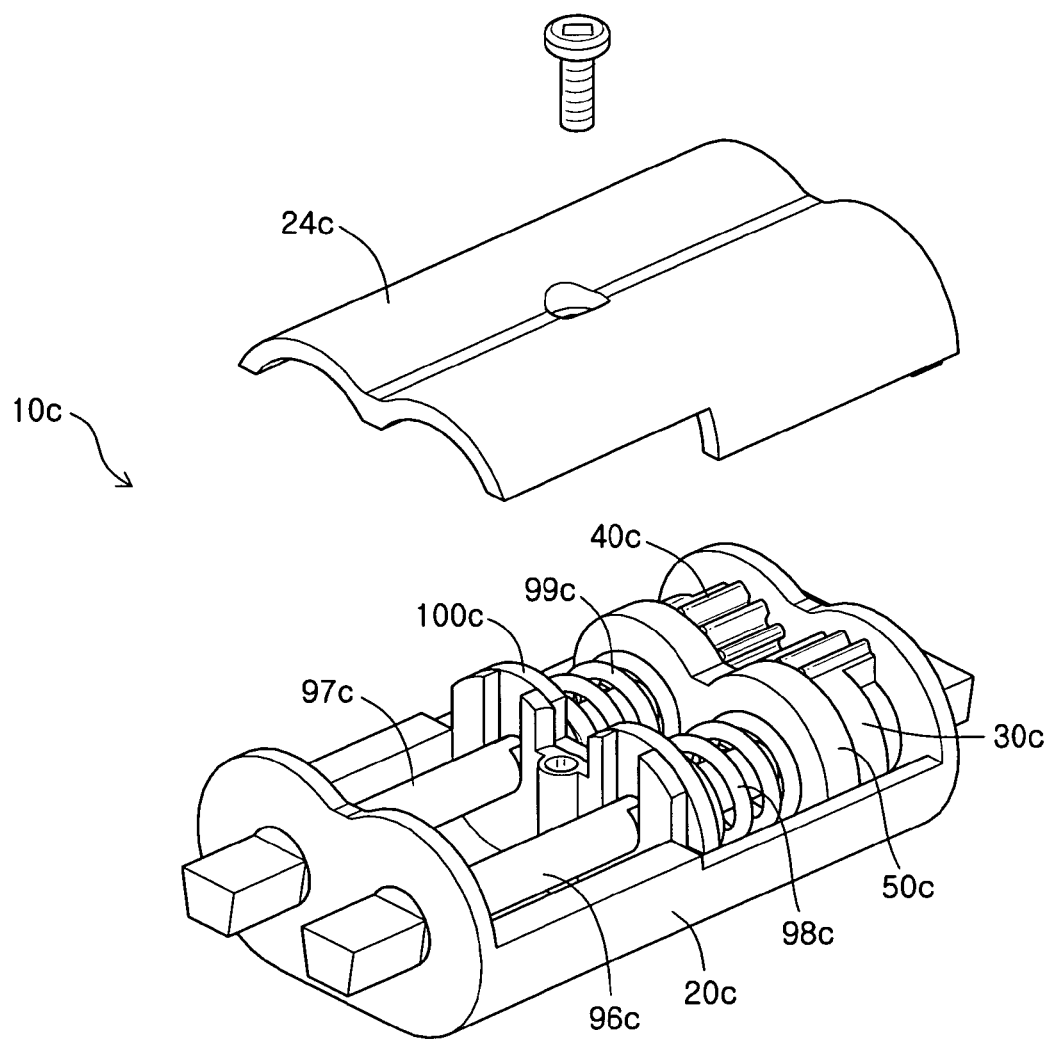
FIG. 18 is a perspective view of a hinge device according to a third embodiment of the present invention, with a case cover separated therefrom to show the interior of the hinge device.
Figure 19:
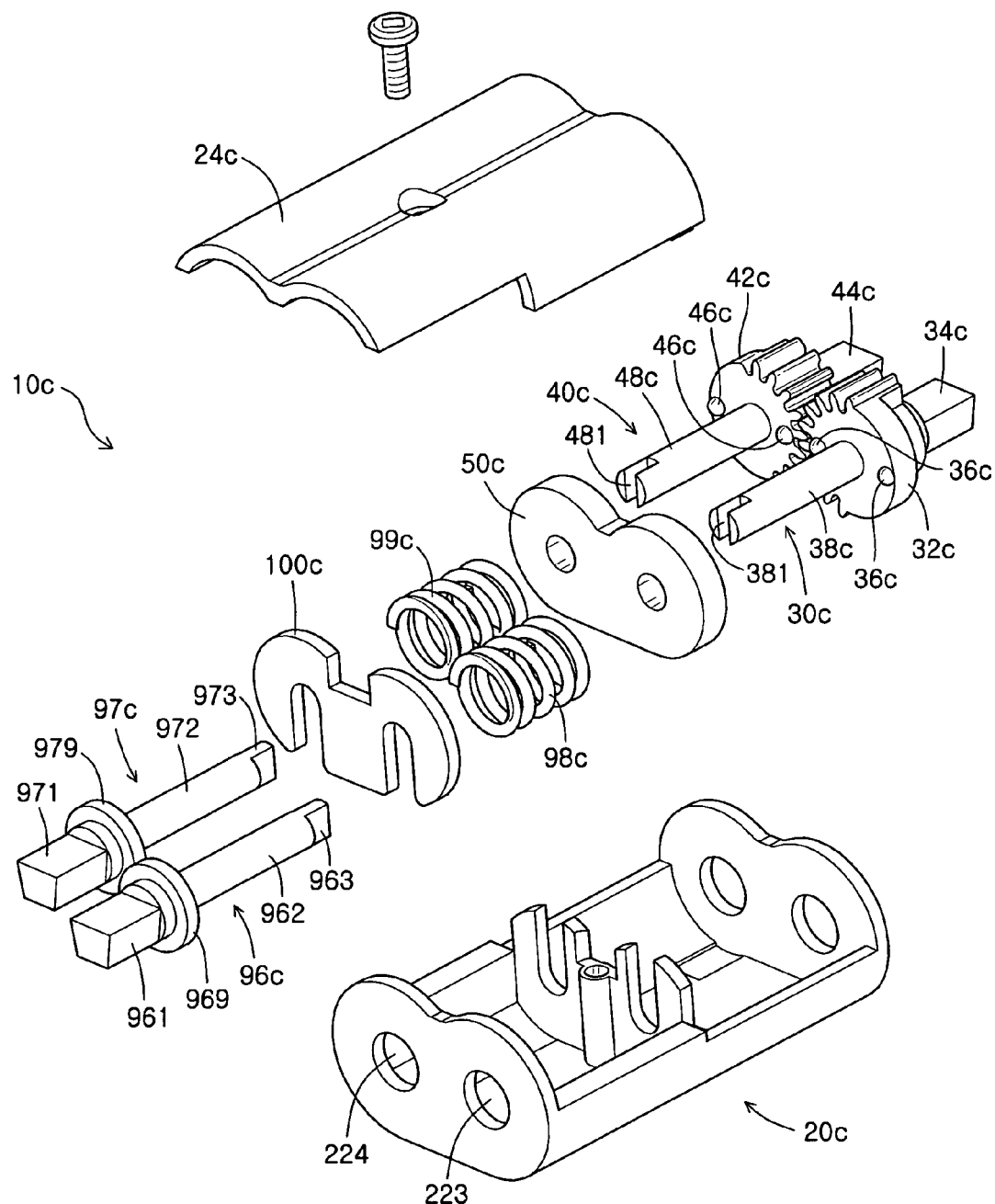
FIG. 19 is an exploded perspective view of the hinge device of FIG. 18.
Figure 20:
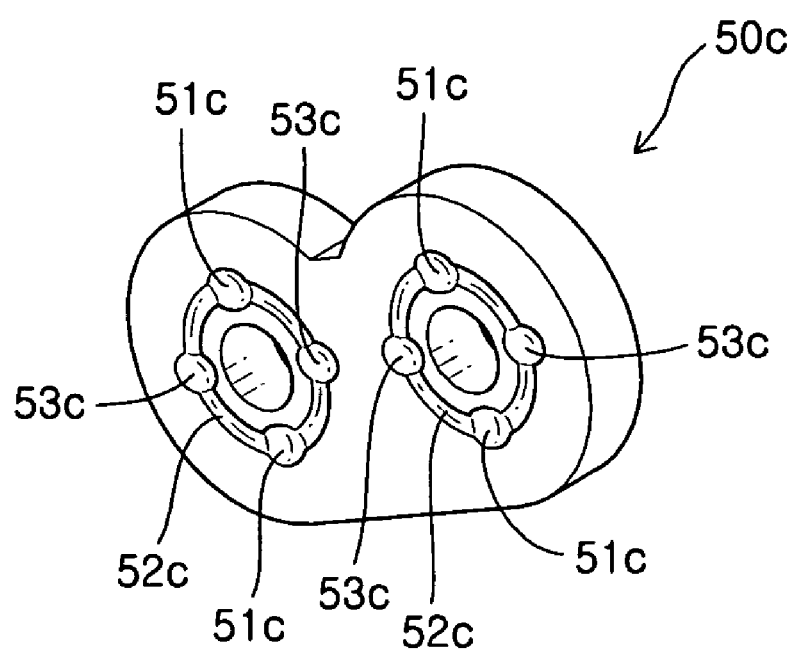
FIG. 20 is a perspective view of a linearly moving member in FIG. 19.

FIGS. 18 to 20 are views of a hinge device according to a third embodiment of the present invention. Referring to FIGS. 18 and 19, a hinge device 10c includes a case 20c, first and second rotating members 30c and 40c, a linearly moving member 50c, first and second resilient members 98c and 99c, a supporting plate 100c, first and second coupling rods 96c and 97c, and a case cover 24c. Compared with the case 20 shown in FIG. 4, the case 20c is the same as the case 20 in view of their configurations except that it is provided with through-holes 223 and 224 instead of the coupling stubs 221 and 222. Coupling portions 961 and 971 of the first and second coupling rods 96c and 97c to be described later pass through the two through-holes 223 and 224 and protrude outside of the case, respectively.

The first and second rotating members 30c and 40c are configured to be symmetric with each other. The first and second rotating members 30c and 40c include first and second gear portions 32c and 42c with mutually engaging gears, respectively. Both sides of the first and second gear portions 32c and 42c are provided with coupling portions 34c and 44c in the form of a quadrangular rod and extension rods 38c and 48c, respectively. Each of the two gear portions 32c and 42c is provided with two hemispherical protrusions 36c and 46c at an interval of 180 degrees. Distal ends of the extension rods 38c and 48c are provided with coupling grooves 381 and 481. Distal ends of the coupling rods 96c and 97c to be described later are engaged with the coupling grooves 381 and 481.

Referring to FIGS. 18 to 20, the linearly moving member 50c is provided with circular tracks 52c along which the protrusions 36c and 46c move, and recesses 51c and 53c formed within the tracks into which the protrusion can be inserted. Each track has a pair of recesses 53c at right and left sides thereof and a pair of recesses 51c at upper and lower sides thereof. When the protrusions 36c and 46c are inserted into the pair of recesses 53c at the right and left sides, the two units of the portable radiotelephone are fixed in the unfolded state at 180 degrees. This state is shown in FIGS. 18 and 19. Those skilled in the art can understand the following. When the protrusions are inserted into the recesses 51c at the upper and lower sides by applying a force to one of the units to rotate one of the rotating members in a direction, the portable radiotelephone is fixed in the folded state. When the protrusions are inserted into the recesses 51c by rotating one of the rotating members in an opposite direction, the portable radiotelephone is fixed in an unfolded state at 360 degrees. When the protrusions 36c and 46c escape from the recesses 51c and 53c, they can be maintained in a stationary state at arbitrary positions. In addition to the recesses 51c and 53c shown in FIG. 20, a desired number of recesses may be formed at required circumferential positions in the tracks 52c.

Referring to FIGS. 18 and 19, the two coupling rods 96c and 97c includes the coupling portions 961 and 971 in the form of a quadrangular rod, and extensions 962 and 972, respectively. Stopper plates 969 and 979 are provided between the coupling portions 961 and 971 and the extensions 962 and 972, respectively, so that the coupling rods cannot escape from the through-holes 223 and 224 at the end wall of the case 20c. Protruding end portions 963 and 973 are provided at distal ends of the extensions. The protruding end portions 963 and 973 are inserted into the coupling grooves 381 and 481 of the extension rod 38c and 48c of the rotating members 30c and 40c to allow the extension rods 38c and 48c and the coupling rods 96c and 97c to rotate together with each other. Consequently, the first and second units 7 and 9 are coupled to the coupling portions 34a and 44c of the extension rods 38c and 48c and the coupling portions 961 and 971 of the coupling rods 96c and 97c, respectively. Since the other configurations are the same as the first embodiment, a detailed description thereof will be omitted. It can be understood by those skilled in the art that the hinge device of this embodiment provides a feature of a so-called "free stop type hinge" by means of the protrusions 36c and 46c, the tracks 52c and the recesses 51c and 53c and the two units coupled to the hinge device can be moved to the unfolded position of the portable radiotelephone at 360 degrees.

Meanwhile, in the first and second embodiments, it has been described that the passages are formed at the both sides of the case and a connecting wires between the first and second units 7 and 9 passes through the passages. However, the present invention is not limited thereto.

Figure 21:
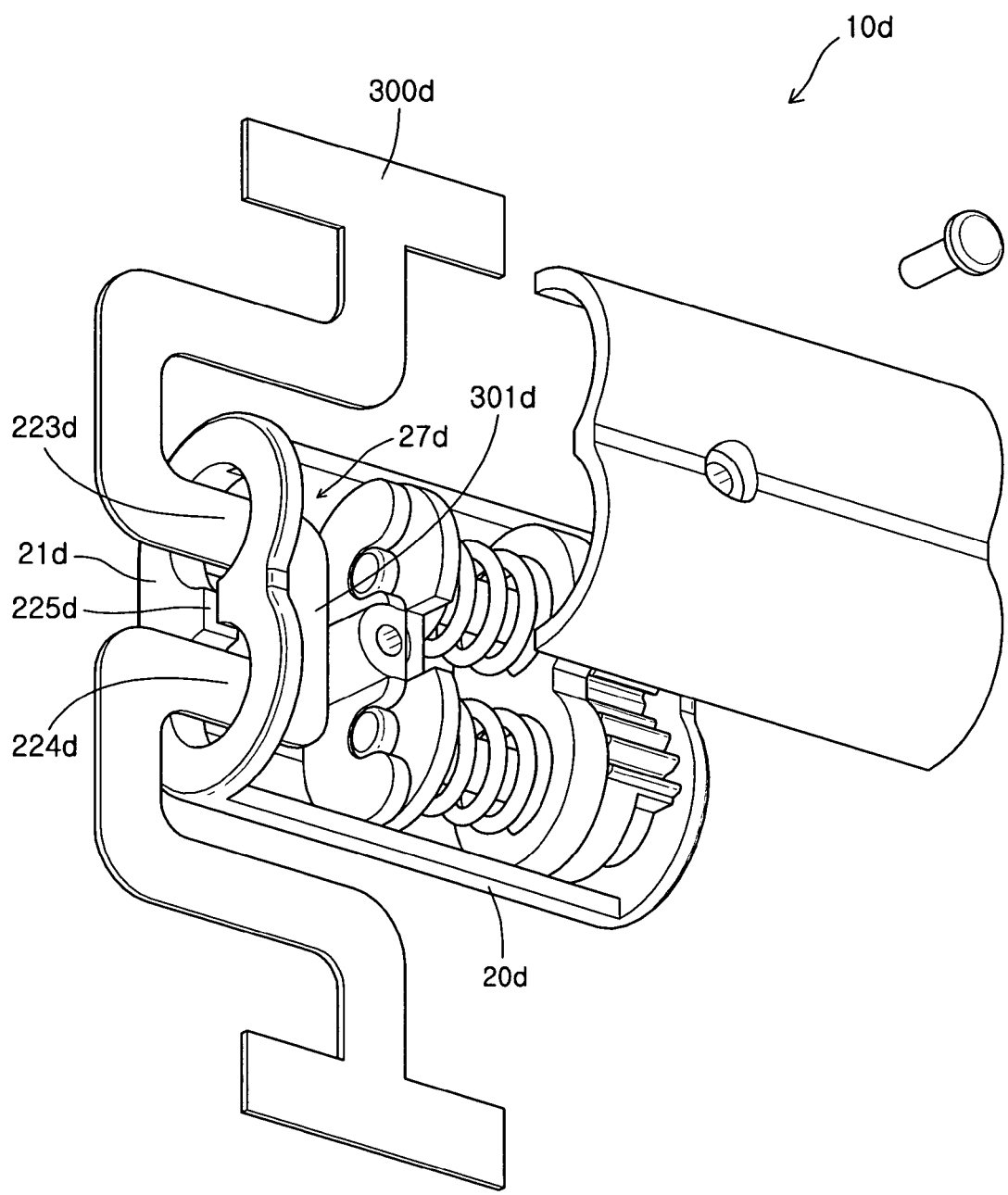
FIG. 21 is a perspective view of a hinge device according to a fourth embodiment of the present invention, with a case cover separated therefrom to show the interior of the hinge device.

FIG. 21 shows a hinge device according to a fourth embodiment of the present invention, with a case cover disassembled therefrom. When the hinge device of the fourth embodiment is compared with the hinge device of the third embodiment with reference to FIGS. 18 and 21, the hinge device of the fourth embodiment is very similar to the third embodiment shown in FIG. 18 in view of their configurations except that a passage 225d is provided at a second end wall 21d to allow two through-holes 223d and 224d to communicate with each other and the coupling rods (96c and 97c in FIG. 18) is not provided.

Figure 22:
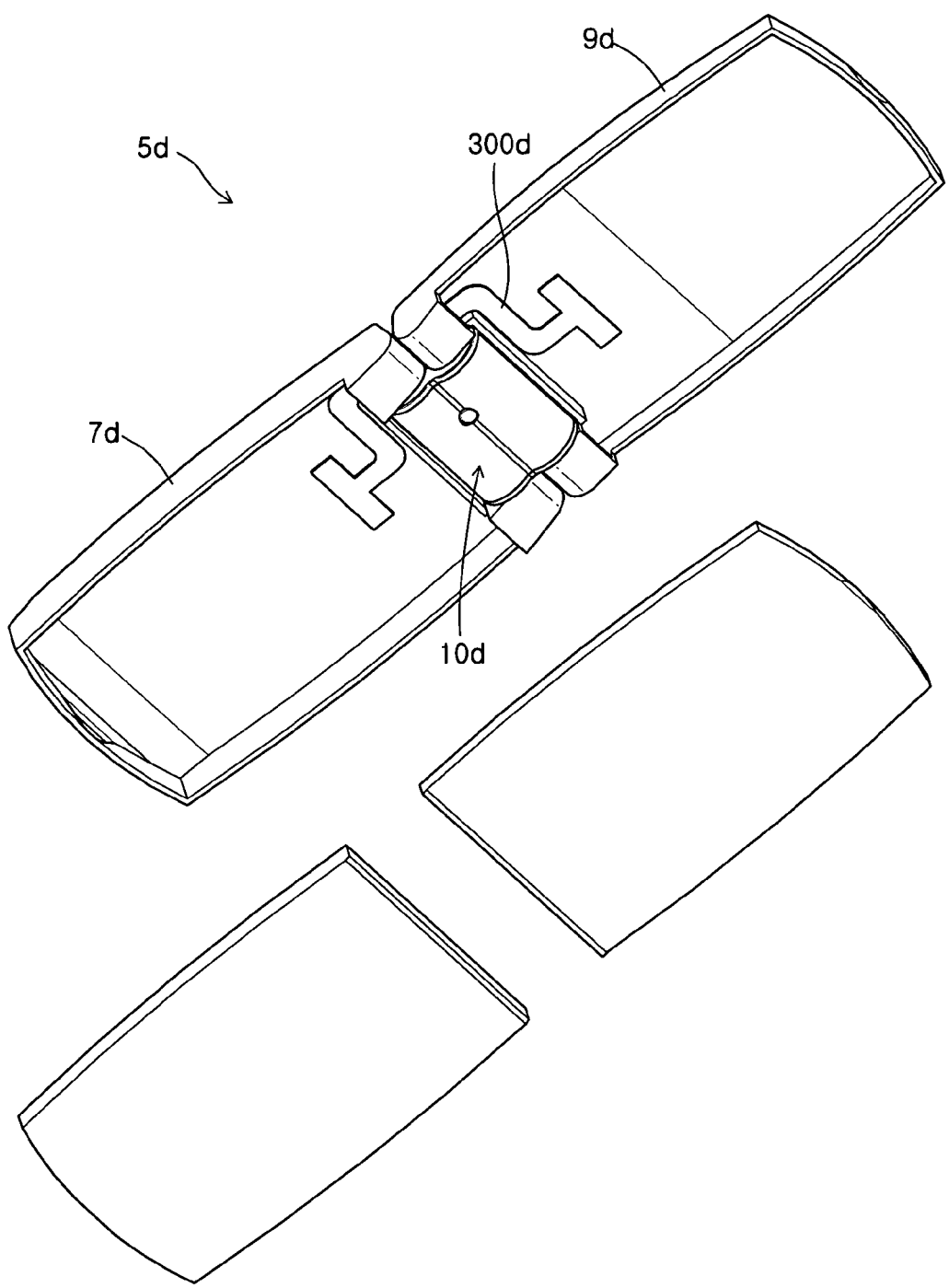
FIG. 22 is a perspective view showing a state where the hinge device of FIG. 21 is mounted in a portable radiotelephone.

Referring to FIGS. 21 and 22, a flexible printed cable 300d as an electrical connection circuit wire is used between two units 7d and 9d. The flexible printed cable 300d is constructed in such a manner that both branches thereof extend from respective ones of the units 7d and 9d toward the other units and are bent toward the hinge 10d to extend into the hinge 10d and then bent back in the original direction to meet each other. An intermediate portion 301d that is bent toward and extends into the hinge is inserted into the hinge through the two through-holes 223c and 224c and the passage 225d to be contained in a second chamber 27d of a case 20d. Referring to FIGS. 21 and 22, one branch of the flexible printed cable 300d extends and is connected to the first unit 7d of the portable radiotelephone 5d and the other branch thereof extends and is connected to the second unit 9. Since the intermediate portion 301d of the flexible printed cable 300d is contained in the second chamber 27d of the hinge device 10d so that it cannot be exposed to the outside, the flexible printed cable 300d can more safely connect the first and second units 7d and 9d of the portable radiotelephone 5 to each other. Although not specifically shown in figures, the first and second units 7d and 9d include coupling projections that surround the connection circuit wire and are rotatably inserted into the two through-holes 223d and 224d of the hinge device 10d, respectively. Although not specifically shown in the figures, it can be understood by those skilled in the art from the above description that the coupling projections are constructed such that the flexible printed cable 300d passes through and is well contained within the coupling projections.

According to the hinge device of the present invention, a portable folder-type radiotelephone can be unfolded at 180 or even 360 degrees. Further, when the portable folder-type radiotelephone is unfolded by 180 degrees, the unfolded folder-type radiotelephone can take the shape of a conventional portable bar-type radiotelephone in that there is no protruding intermediate portion or staggering of two units. If such a hinge device has the components in the embodiments, it can provide a variety of operating features. Further, it can provide flexible circuit wire connection.

Although the hinge device of the present invention has been described by way of examples as being applied to portable radiotelephones in the embodiments, it is not limited thereto. It can be understood by those skilled in the art that the hinge device of the present invention can be applied to any apparatuses with two rotatably coupled units in addition to portable radiotelephones.

Although the present invention has been described in connection with the preferred embodiments, it can be understood by those skilled in the art that various modifications and changes can be made thereto without departing from the scope and spirit of the present invention and that such modifications and changes also fall within the scope of the present invention.

What is claimed is:

1. A hand-held electronic device comprising:
   a first unit;
   a second unit, wherein at least one of the first and second units comprises a display, and wherein at least one of the first and second units comprises an information input device;
   a hinge device interconnecting the first and second units, the hinge device comprising:
      a housing enclosing at least one component of the hinge device and being separate from the first and second units;
      a first rotating member coupled to the first unit and rotatable about a first rotation axis with respect to the housing;
      a second rotating member coupled to the second unit and rotatable about a second rotation axis with respect to the housing;
      a first linearly moving member cooperating with the first rotating member and linearly movable with respect to the housing;
      a second linearly moving member cooperating with the second rotating member and linearly movable with respect to the housing;
      a first resilient member urging the first linearly moving member against the first rotating member; and
      a second resilient member urging the second linearly moving member against the second rotating member.

2. The device as claimed in claim 1, wherein the first and second rotating members are engagedly rotated.

3. The device of claim 1, wherein the first and second rotating members comprise mutually engaging gears so that the rotating members can rotate together with each other.

4. The device of claim 1, wherein the first and second linearly moving members are independently moved.

5. The device of claim 1, wherein the first and second linearly moving members are integrated together.

6. The device of claim 1, wherein the first and second rotating members are independently rotated.

7. The device of claim 1, wherein the first and second linearly moving members are provided with through-holes, the first and second rotating members comprise extension rods extending in the first and second rotation axes, respectively, and the first and second linearly moving members and the first and second resilient members are fitted around the extension rods.

8. The device as claimed in claim 1, wherein the housing comprises passages through which a circuit wire connecting between the first and second units passes.

9. The device as claimed in claim 1, wherein the first and second rotating members are connected to the first and second units at one end of the housing, and the other end of the housing is provided with holes through which a circuit wire passes.

10. The device of claim 1, wherein the hand-held electronic device comprises one of a wireless communication device and a hand-held computer.

11. The device of claim 1, wherein the housing encloses at least part of the first linearly moving member and at least part of the second linearly moving member.

12. The device of claim 1, wherein the housing encloses at least part of the first rotating member and at least part of the second rotating member.

13. The device of claim 1, wherein the first and second rotation axes extend side-by-side and substantially parallel.

14. The device of claim 1, wherein the first and second linearly moving members are arranged side-by-side.

15. The device of claim 1, wherein the first and second rotating members are arranged side-by-side.

16. The device as claimed in claim 1, wherein one of the first rotating member and the first linearly moving member comprises a first cam portion and the other comprises a first cam follower portion cooperating with the first cam portion, and one of the second rotating member and the second linearly moving member comprises a second cam portion and the other comprises a second cam follower portion cooperating with the second cam portion.

17. The device as claimed in claim 16, wherein each of the first and second cam portions comprises an upward slanting surface and a downward slanting surface.

18. The device as claimed in claim 17, wherein the cam portion comprises a first insertion groove into which the cam follower portion can be inserted, a horizontal surface, and a second insertion groove into which the cam follower portion can be inserted, and wherein the first insertion groove is formed about an end of the downward slanting surface.

19. The device as claimed in claim 16, wherein the first and second linearly moving members are interdependently moved.

20. The device as claimed in claim 16, wherein the first cam portion comprises a first cam surface, which comprises a first fixing groove into which the first cam follower portion can be inserted; wherein the second cam portion comprises a second cam surface, which comprises a second fixing groove into which the second cam follower portion can be inserted; wherein when the first cam follower portion is inserted into the first fixing groove, the second rotating member can rotate while the first rotating member is maintained in a stationary state; and wherein when the second cam follower portion is inserted into the second fixing groove, the first rotating member can rotate while the second rotating member is maintained in a stationary state.

21. The device as claimed in claim 20, wherein the first cam surface further comprises a horizontal surface contiguous to the first fixing groove, and stoppers for preventing movement of the first cam follower portion from the stopper in one direction.

22. The device as claimed in claim 21, wherein the first cam surface further comprises at least one intermediate stopper groove in the horizontal surface, and wherein the intermediate stopper groove is shallower than the first and second fixing grooves.

23. The device as claimed in claim 21, wherein the second cam surface further comprises an upward slanting surface, a horizontal surface, and a stopper for preventing movement of the second cam follower portion from the stopper in one direction.

24. The device as claimed in claim 21, wherein the second cam surface comprises an upward slanting surface and a downward slanting surface.

25. The device as claimed in claim 1, wherein one of the first rotating member and the first linearly moving member comprises a first protrusion and the other comprises a groove into which the first protrusion can be inserted, and one of the second rotating member and the second linearly moving member comprises a second protrusion and the other comprises a second groove into which the second protrusion can be inserted.

26. The device as claimed in claim 25, wherein the member provided with the first groove is formed with a track for guiding movement of the first protrusion therealong, and the member provided with the second groove is formed with a track for guiding movement of the second protrusion therealong.

27. The device as claimed in claim 25, wherein the first and second rotating members are engagedly rotated.

28. The device as claimed in claim 25, wherein the first and second linearly moving members are engagedly moved.

29. A hand-held electronic device comprising:
a first unit;
a second unit, wherein at least one of the first and second units comprises a display, and wherein at least one of the first and second units comprises an information input device;
a hinge device interconnecting the first and second units such that the first and second units can rotate relative to the hinge device, the hinge device comprising:
a housing enclosing at least one component of the hinge device, wherein the housing is not a portion of the first unit or the second unit, wherein the housing is located between the first and second units;
a first rotating member coupled to the first unit and rotatable about a first rotation axis with respect to the housing;
a second rotating member coupled to the second unit and rotatable about a second rotation axis with respect to the housing;
a first linearly moving member cooperating with the first rotating member and linearly movable with respect to the housing;
a second linearly moving member cooperating with the second rotating member and linearly movable with respect to the housing;
a first resilient member urging the first linearly moving member against the first rotating member; and
a second resilient member urging the second linearly moving member against the second rotating member.

30. The device of claim 29, wherein the first and second rotation axes extend side-by-side and substantially parallel.

31. The device of claim 29, wherein the housing is movable relative to both the first and second units.

32. The device of claim 29, wherein the housing encloses at least part of the first linearly moving member and at least part of the second linearly moving member.

33. A hand-held electronic device comprising:
a first unit;
a second unit, wherein at least one of the first and second units comprises a display, and wherein at least one of the first and second units comprises an information input device;
a hinge device interconnecting the first and second units, such that the first and second units can rotate relative to the hinge device, the hinge device comprising:
a housing;
a first rotating member coupled to the first unit and rotatable about a first rotation axis with respect to the housing;
a second rotating member coupled to the second unit and rotatable about a second rotation axis with respect to the housing;
a first linearly moving member cooperating with the first rotating member and linearly movable with respect to the housing;
a second linearly moving member cooperating with the second rotating member and linearly movable with respect to the housing;
a first resilient member urging the first linearly moving member against the first rotating member; and
a second resilient member urging the second linearly moving member against the second rotating member;
wherein the first and second rotation axes extend side-by-side and substantially parallel.

34. The device of claim 33, wherein the housing is movable relative to both the first and second units.

35. The device of claim 33, wherein the first and second linearly moving members are arranged side-by-side.

36. The device of claim 33, wherein the first and second rotating members are arranged side-by-side.

* * * * *